(12) United States Patent
Gupta et al.

(10) Patent No.: US 8,745,320 B2
(45) Date of Patent: Jun. 3, 2014

(54) ENSURING WRITE OPERATION CONSISTENCY USING MULTIPLE STORAGE DEVICES

(75) Inventors: Nitin Gupta, Fremont, CA (US); Kiron Vijayasankar, Sunnyvale, CA (US); Joshua Berry, El Cerrito, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 203 days.

(21) Appl. No.: 13/464,714

(22) Filed: May 4, 2012

(65) Prior Publication Data

US 2013/0297855 A1 Nov. 7, 2013

(51) Int. Cl.
*G06F 12/02* (2006.01)
*G06F 3/06* (2006.01)

(52) U.S. Cl.
CPC .................................. *G06F 3/0656* (2013.01)
USPC ......................................................... 711/103

(58) Field of Classification Search
CPC .................................................. G06F 3/0656
See application file for complete search history.

(56) References Cited

U.S. PATENT DOCUMENTS

| 4,953,930 | A * | 9/1990 | Ramsey et al. ................. 385/14 |
| 6,622,263 | B1 * | 9/2003 | Stiffler et al. .................... 714/13 |
| 8,205,059 | B2 * | 6/2012 | Wu et al. ....................... 711/170 |
| 8,244,969 | B2 * | 8/2012 | McWilliams et al. ........ 711/103 |
| 2003/0200343 | A1 * | 10/2003 | Greenblat et al. ............ 709/251 |
| 2007/0011516 | A1 * | 1/2007 | Mack et al. .................... 714/724 |
| 2008/0198706 | A1 * | 8/2008 | Wu et al. ................... 369/30.23 |
| 2010/0106895 | A1 * | 4/2010 | Condit et al. ................. 711/103 |
| 2013/0297854 | A1 * | 11/2013 | Gupta et al. .................. 711/103 |

* cited by examiner

*Primary Examiner* — Hiep Nguyen
(74) *Attorney, Agent, or Firm* — Park, Vaughan, Fleming & Dowler LLP (57) ABSTRACT

Relatively small capacity solid-state storage devices (SSD) are combined with larger capacity magnetic disk storage devices for storing storage block write data to ensure data consistency. Write operations are stored in a sequential write buffer in an SSD to guarantee the storage of write data and then copied from the sequential write buffer to the destination address in a magnetic disk storage device. The sequential write buffer store write data in locations corresponding to the order of receipt of write operations. Write data from the sequential write buffer is transferred to the magnetic disk storage device in the same order and a checkpoint index is frequently updated to indicate the completion of some transfers. During system initialization, the most recent value of the checkpoint index is retrieved and used as a starting location for transferring write data from the sequential write buffer to the magnetic disk storage device.

22 Claims, 7 Drawing Sheets

ENSURING WRITE OPERATION CONSISTENCY USING MULTIPLE STORAGE DEVICES

CROSS-REFERENCE TO RELATED APPLICATIONS

This application is related to U.S. patent application Ser. No. 12/730,179, entitled "Virtualized Data Storage Over Wide-Area Networks", filed Mar. 23, 2010; U.S. patent application Ser. No. 12/730,192, entitled "Virtualized Data Storage Cache Management", filed Mar. 23, 2010; U.S. patent application Ser. No. 12/730,198, entitled "Virtual Data Storage System Optimizations", filed Mar. 23, 2010; U.S. Provisional Patent Application No. 61/606,893, entitled "Virtualized Data Storage System Architecture Using Prefetching Agent, filed Mar. 6, 2012; and U.S. patent application Ser. No. 13/464,713, entitled "Ensuring Write Operation Consistency Using RAID Storage Devices," filed 4 May 2012, all of which are incorporated by reference herein for all purposes.

BACKGROUND

This disclosure relates generally to data storage systems, and systems and methods to improve storage efficiency, compactness, performance, reliability, and compatibility. Magnetic disk storage devices, such as hard disk drives, provide large amounts of affordable storage. However, magnetic disk storage devices often include an internal write buffer for storing write data before it is written to disk. Write data stored in the internal write buffer is at risk of loss if there is a power failure. Magnetic disk storage devices may be configured so that write operations are only acknowledged after the write data has been stored on disk, as opposed to the internal write buffer; however, this reduces write performance greatly. More specialized hardware, such as hardware RAID controllers, may include battery or supercapacitor power backups to preserve data in the write buffer in the event of a power failure; however, these hardware components increase the cost and complexity of systems.

In contrast, many relatively low-cost solid-state disk drives (SSDs) include a backup power source, such as a battery or supercapacitor, to preserve write data in the write buffer in the event of a power failure. However, SSDs are much more expensive than magnetic disk drives of similar storage capacity. Thus, most low-cost SSDs have much smaller storage capacities than typical magnetic disk drives.

BRIEF DESCRIPTION OF THE DRAWINGS

Embodiments will be described with reference to the drawings, in which.

SUMMARY

Embodiments of the invention combine a relatively small capacity solid-state storage device (SSD) to ensure data consistency in the event of a power failure or other problem with a larger capacity magnetic disk storage device for storing storage block write data. Embodiments of the invention first store write operation in a sequential write buffer in an SSD to guarantee the storage of write data and then copy write data from the sequential write buffer to the desired storage location in a magnetic disk storage device.

In an embodiment, the SSD guarantees the storage and consistency of any write operation that is received and acknowledged by the SSD. An embodiment of the invention receives write operations from storage clients. The write operations include write data and a destination address. The embodiment of the invention stores a page including at least the write data and the destination address in a sequential guaranteed write buffer in the SSD. The sequential guaranteed write buffer stores pages in locations corresponding to the order of receipt of write operations, rather than according to their destination addresses. Additionally, the SSD guarantees the consistency of any pages stored in the sequential guaranteed write buffer.

In addition to storing pages in the sequential guaranteed write buffer, an embodiment of the invention also transfers at least the write data from pages to their respective destination addresses in a magnetic disk storage device. Unlike the SSD, the magnetic disk storage device may not guarantee write operations. However, the magnetic disk storage device typically provides much higher storage capacity than an SSD of similar price. Write data from the sequential guaranteed write buffer is transferred to the magnetic disk storage device in the same order as their corresponding write operations were received. Additionally, an embodiment of the invention frequently updates a checkpoint index value to indicate that a portion of the pages in the sequential guaranteed write buffer have been successfully transferred from the SSD to the magnetic disk storage device.

In an embodiment, during system initialization following a power failure or any other system downtime, the most recent value of the checkpoint index is retrieved. An embodiment of the invention begins transferring write data from the sequential guaranteed write buffer to the magnetic disk storage device from the buffer location corresponding with the checkpoint index value. This transfer continues until the write data from all of the pages in the sequential guaranteed write buffer that may not have been processed earlier are transferred to the magnetic disk storage device. At this point, all of the write operations guaranteed by the SSD have been successfully transferred to the magnetic disk storage device. Meanwhile, during system initialization, embodiments of the storage system may receive and store additional write operations once the buffer locations of the checkpoint index and the most-recently accepted write data have been identified.

DETAILED DESCRIPTION OF ILLUSTRATIVE EMBODIMENTS

Figure 1:
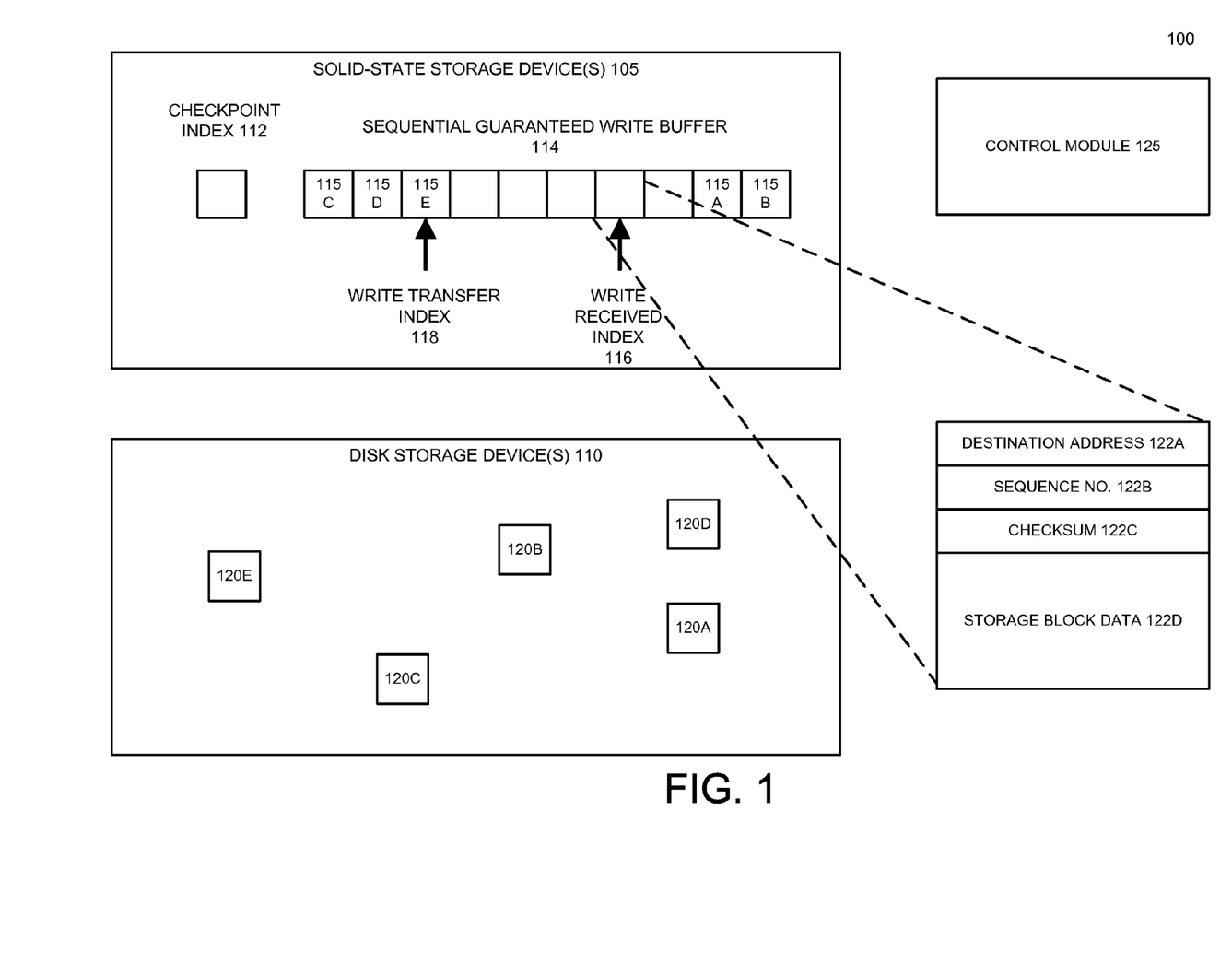
FIG. 1 illustrates an example hardware and data configuration for ensuring write operation consistency with virtualized data storage according to an embodiment of the invention.

To provide high write performance, large storage capacity, and reliability and data consistency, embodiments of the invention combine a relatively small capacity solid-state storage device (SSD) to ensure data consistency in the event of a power failure or other problem with a larger capacity magnetic disk storage device for storing storage block write data. Embodiments of the invention first store write operation in a sequential write buffer in an SSD to guarantee the storage of write data and then copy write data from the sequential write buffer to the desired storage location in a magnetic disk storage device. FIG. 1 illustrates an example hardware and data configuration 100 for ensuring write operation consistency with virtualized data storage according to an embodiment of the invention.

Example configuration 100 includes one or more solid-state storage devices (SSD) 105 and one or more magnetic disk storage devices 110, such as hard disk drives. SSD 105 uses solid-state memory to store data, but is typically accessed in the same manner of a traditional storage block I/O hard disk drive. SSD 105 may use flash memory, non-volatile RAM (NVRAM), or any other type of non-volatile solid-state memory device.

In an embodiment, SSD 105 includes a checkpoint index block 112 and a sequential guaranteed write buffer 114. Sequential guaranteed write buffer 114 stores write operations in the form of pages 115. Pages 115 are stored in sequential guaranteed write buffer 114 in the order that the corresponding write operations are received. Sequential guaranteed write buffer 114 stores write data in pages 115 in the order that they are received, regardless of the desired destination storage address. As described in detail below, by preserving the order of write operations in the sequential guaranteed write buffer 114, embodiments of the invention can preserve the consistency of data after recovering from a power failure. In a further embodiment, sequential guaranteed write buffer 114 is implemented as a circular or ring buffer, so that once the end of the sequential guaranteed write buffer 114 is reached, further write operations will overwrite pages at the beginning of the sequential guaranteed write buffer 114.

In an embodiment, the SSD 105 guarantees the consistency and durability of write operations to the sequential guaranteed write buffer 114. In this embodiment, when a write operation from a storage client to the sequential guaranteed write buffer 114 is received by the SSD 105, the SSD 105 will not acknowledge the completion of the write operation to the storage client until the write data is guaranteed to be stored in the sequential guaranteed write buffer, even in the event of a power failure or other problem. This may be done by including a backup power source in the SSD 105, such as a battery or supercapacitor, to allow any temporary write buffer or cache to be flushed to non-volatile storage if power is lost or by not acknowledging the completion of a write operation until the write data has actually been committed to non-volatile storage.

During operation, a write received index 116 is maintained by a storage client. The write received index 116 indicates the next available page location in the sequential guaranteed write buffer 114 for storing received write operations. For each received write operation, a page, such as page 115A, is stored at the current location of the write received index 116. After a page has been written to the location of the write received index 116, the write received index 116 is advanced to the next available page location in the sequential guaranteed write buffer 114. In an embodiment, this will be the next sequential location in the sequential guaranteed write buffer, unless the end of the buffer has been reached, in which case the write received index 116 will be set to the first location in the sequential guaranteed write buffer 114.

Page 115A is an example of the contents of a page stored in sequential guaranteed write buffer 114 for a received write operation. Page 115A includes a destination address 122A, which is the storage address on the disk storage device 110 that the storage client actually wants this write data stored in. In an embodiment, the disk storage device 110 has a larger storage capacity than the SSD 105. Therefore, destination address 122A may not be a valid storage address on the SSD 105.

Page 115A also includes a sequence number 122B. A sequence number 122B indicates the relative order that the page was stored in the sequential guaranteed write buffer 114. This may be used to distinguish between pages recently written to the sequential guaranteed write buffer that have yet to be copied to the disk storage device 110 and older pages that have been copied to the disk storage device 110 and thus may be safely overwritten. Page 115A also optionally includes a checksum 122C to be used for error detection and/or correction.

Lastly, an embodiment of page 115A includes storage block data 122D. This storage block data 122D corresponds with the write data provided by a storage client for storage.

Sequential guaranteed write buffer 114 temporarily stores write operations in the order that they are received. Additionally, pages of write data are copied from the sequential guaranteed write buffer 114 to their intended destination addresses in the magnetic disk storage device 110. In an embodiment, a write transfer index 118 indicates the next page location in the sequential guaranteed write buffer 114 with data that needs to be stored in the disk storage device. In an embodiment, the page at the current location of the write transfer index 118 is accessed to determine its destination address and sequence number. If the sequence number indicates that this page may not have been written to the disk storage device 110, then at least the storage block data of this page is copied to the destination address in the disk storage device 110. The write transfer index 118 is then advanced to the next location in the sequential guaranteed write buffer 114. Although page data is stored in sequential guaranteed write buffer 114 sequentially according to the order that write operation are received, storage block data from sequential pages may be stored in arbitrary, non-sequential addresses in disk storage device. For example, pages 115A, 115B, 115C, 115D, and 115E are written sequentially to sequential guaranteed write buffer 114. These pages are then copied sequentially to disk storage device 110 as write transfer index 118 advances through sequential guaranteed write buffer 114. However, the storage block data from pages 115A, 115B, 115C, 115D, and 115E is stored in non-sequential destination addresses 120A, 120B, 120C, 120D, and 120E, respectively, in disk storage device 110.

After copying and verifying a number of pages from sequential guaranteed write buffer 114 to the disk storage device 110, an embodiment of the invention updates the checkpoint index 112 with the location in the sequential guaranteed write buffer of the most recently copied and verified page. During system initialization (for example following a power outage or other system downtime), the checkpoint index 112 is accessed to determine the starting value for the write transfer index 118. As described below, the checkpoint index 112 is frequently updated to minimize the amount of data that needs to be written or rewritten to the magnetic disk storage device 110 following a power outage or other system downtime.

Embodiments of the invention include a control module 125. Control module 125 manages the positions of indices 116 and 118, the storage operations performed at the locations of indices 116 and 118, updating the checkpoint index 112, and generating page data structures from received write operations including the generation and/or arrangement the destination address, sequence number, checksum, and/or storage block data in the page data structure. Embodiments of the control module 125 may be implemented using any combination of software and/or hardware. For example, a control module 125 may be a software module executing on a general-purpose computer or on a microprocessor within storage hardware. The example control module 125 may receive write operation requests from one or more storage clients via storage interfaces and protocols such as iSCSI and initiate corresponding write operations of complete page data structures to the solid-state storage device 105 through standard I/O and storage interfaces. Similarly, the control module 125 may initiate read operations to retrieve destination addresses of pages in the sequential guaranteed write buffer 114 and initiate copy operations to copy pages from the sequential guaranteed write buffer 114 to the disk storage device 110. In this example, the software-only control module maintains and advances the indices 116 and 118. Additionally, the sequential guaranteed write buffer 114 and checkpoint index 112 may be designated portions of a standard solid-state storage device with the above-described functionality implemented by control module 125, as opposed to specialized hardware.

Figure 2A:
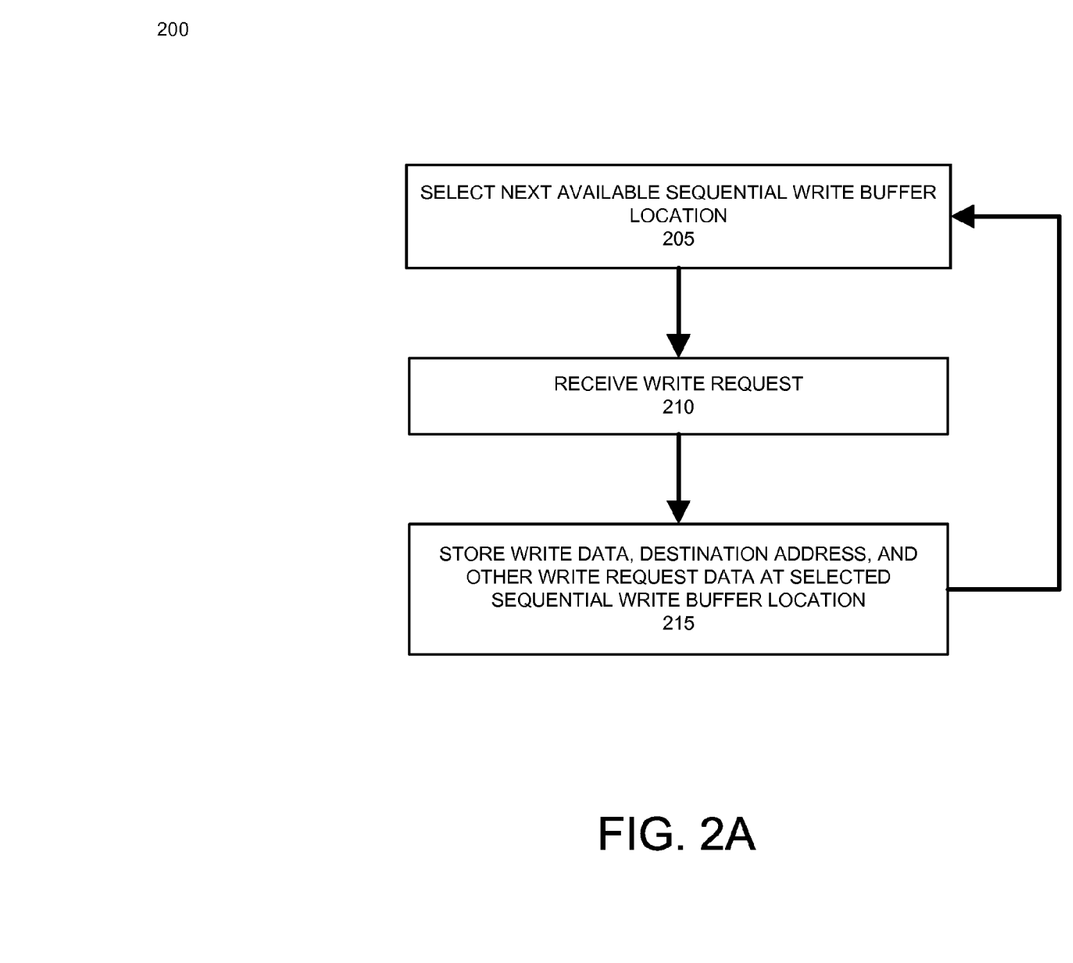
FIGS. 2A-2B illustrate methods of ensuring write operation consistency with virtualized data storage according to an embodiment of the invention.
Figure 2B:
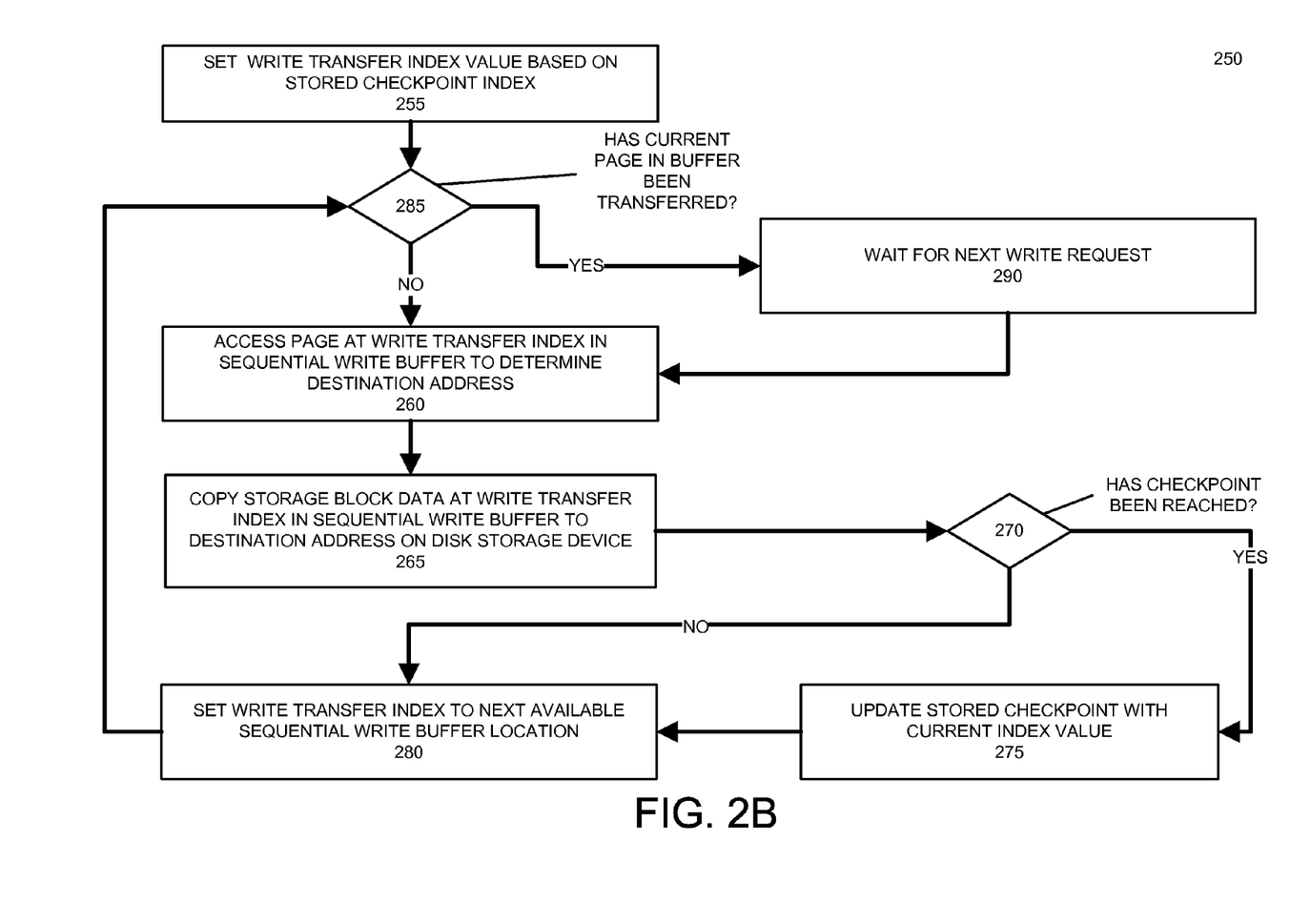

FIGS. 2A-2B illustrate methods of ensuring write operation consistency with virtualized data storage according to an embodiment of the invention. FIG. 2A illustrates a method 200 of processing incoming write requests from storage clients according to an embodiment of the invention. Step 205 selects the next available sequential guaranteed write buffer location. In an embodiment, a write received index is used to store the address or offset corresponding with this location. In an embodiment, step 205 selects the page location following the most-recently stored page as the next available sequential guaranteed write buffer location. In a further embodiment, the sequential guaranteed write buffer is implemented as a circular buffer. If the most-recently stored page is the last page location in the sequential guaranteed write buffer, then step 205 selects the first page location as the next available sequential guaranteed write buffer location. In an additional embodiment, if the sequential guaranteed write buffer is full (i.e. all of the locations in the sequential guaranteed write buffer are occupied by pages of write data that have yet to be transferred to a magnetic disk storage device), then step 205 may delay processing of further write requests or reject further write requests and return an error message.

Step 210 waits for the receipt of a storage block write request from a storage client. Upon receiving a write request, method 200 proceeds to step 215. Step 215 stores the write data and destination address which are included or derived from the received write request in the selected sequential guaranteed write buffer location. In a further embodiment, step 215 may also store additional data such as a sequence number and/or a checksum or other error detection or error correction data in the selected sequential guaranteed write buffer location. As described below, a sequence number is used to distinguish between recently stored pages that have yet to be copied to the magnetic disk storage device and older pages that have already been copied to the magnetic disk storage device and thus may be safely overwritten. A sequence number may be determined by any function that is monotonic or preserves ordering (with the exception of any hardware or software limitations, such as a counter that rolls over to zero after reaching a maximum value), such as a counter that increments with every page written to the sequential guaranteed write buffer or with every complete "loop" through the sequential guaranteed write buffer.

In yet a further embodiment, step 215 may also frequently store or "checkpoint" the value of the write received index on the SSD. For example, step 215 may store a copy of the value of the write received index after a sufficient quantity of storage block data (e.g. 100 MB) has been stored in the sequential guaranteed write buffer since the previous checkpoint of the write received index. In other embodiments, a new checkpoint for the write received index is established after a sufficient number of pages have been copied to the sequential guaranteed write buffer since the previous checkpoint and/or a sufficient time period has elapsed. As discussed below, the write received checkpoint value may be used to reduce system initialization time following an interruption of operation.

FIG. 2B illustrates a method 250 of transferring pages from the sequential guaranteed write buffer to their intended destination storage addresses in the magnetic disk storage device.

Method 250 begins with step 255 setting the write transfer index value based on the value stored in the write transfer checkpoint index. In an embodiment, if the sequential guaranteed write buffer has not yet been used, then the write transfer checkpoint index may be initialized to the beginning location of the sequential guaranteed write buffer or any other arbitrary starting location. Otherwise, for example upon resuming operation following a power failure, the write transfer checkpoint index may include a value previously written by previous iterations of method 250.

In an embodiment, the write transfer checkpoint index indicates the location of a page in the sequential guaranteed write buffer that has been recently transferred to the magnetic disk storage device and had this transfer verified or guaranteed. In this embodiment, the write transfer index is set to the next page location in the sequential guaranteed write buffer following the location indicated by the write transfer checkpoint index. In an alternate embodiment, the write transfer checkpoint index indicates the location of a page following the location in the sequential guaranteed write buffer that has been recently transferred to the magnetic disk storage device and had this transfer verified or guaranteed. In this embodiment, the write transfer index is set to the write transfer checkpoint index value.

In a further embodiment, step 255 may detect if the previously-stored write transfer checkpoint index value has been corrupted or is otherwise invalid. This may be done using any error detection and/or error correction technique known in the art. If step 255 determines that the previously-stored write transfer checkpoint index value is invalid, then step 255 steps through the page locations of the sequential guaranteed write buffer to identify the "beginning" or oldest write data in the sequential guaranteed write buffer. The page location of the oldest write data may be determined by starting at any page location in the sequential guaranteed write buffer and advancing forward through the sequential guaranteed write buffer until the sequence number of a page location deviates from the expected ordering. This page location corresponds with the oldest write data in the sequential guaranteed write buffer. In this embodiment, step 255 selects this page location as the write transfer index value in the event that the previously-stored write transfer checkpoint index value is invalid.

Methods 200 and 250 may be performed in parallel and/or independently. In an embodiment, step 255 also identifies a page location in the sequential guaranteed write buffer corresponding with the first available page following the most recent write data accepted by the storage system prior to the interruption of operation. This may be determined by starting at the page location corresponding with the write transfer checkpoint index and advancing forward through the sequential guaranteed write buffer until the sequence number of a page location deviates from the expected ordering. This page location is the first available page location after the most-recently accepted write data. Following step 255, method 200 may be performed in parallel and/or independently with method 250, with additional write data added to the sequential guaranteed write buffer beginning with this page location.

As described above, some embodiments of the invention may step through the sequential guaranteed write buffer to search for the location of the oldest write data/first available page in the sequential guaranteed write buffer in certain situations, such as the corruption of the write transfer index checkpoint and/or to resume method 200 during or after method 250. To reduce the time required by this search, further embodiments of the invention may optionally retrieve a previously-stored write received checkpoint value. The search for the location of the oldest write data/first available page in the sequential guaranteed write buffer may then start at the buffer location corresponding with the retrieved write received checkpoint value. This reduces the number of pages that need to be searched in the sequential guaranteed write buffer.

Following step 255, decision block 285 determines if the page in the sequential guaranteed write buffer that is referenced by the write transfer index has been transferred to the magnetic disk storage device. In one embodiment, decision block 285 compares the sequence number of the page at the current write transfer index with that of the page in the preceding location in the sequential guaranteed write buffer to determine if the current page needs to be transferred to the magnetic disk storage device. For example, if the sequence value is a counter that is increases for every write operation or every cycle through the sequential guaranteed write buffer, then the current page needs to be transferred to the magnetic disk storage device if the sequence value of the current page is the same or greater than the sequence value of the previous page.

Conversely, a sequence value of the current page that is less than the sequence value of the preceding page indicates, in this example of a monotonically increasing sequence function, that the current page has already been transferred to the magnetic disk storage device. Because pages are stored sequentially in the sequential guaranteed write buffer, if the current page has already been transferred to the magnetic disk storage device, all pages after the current page have also been transferred to the magnetic disk storage device. Thus, method 250 may proceed to step 290 and await the receipt of one or more additional write requests from storage clients.

If decision block 285 determines that the page in the sequential guaranteed write buffer specified by the write transfer index needs to be transferred to the magnetic disk storage device, then method 250 proceeds to step 260. Step 260 accesses the current page in the sequential guaranteed write buffer, as specified by the write transfer index, to retrieve the destination address stored in this page. This destination address was initially specified by the storage client with its write request.

Step 265 copies the storage block data in the current page to the destination address in the magnetic disk storage device. In an embodiment, step 265 copies the entire page, including the destination address, sequence number, checksum, and/or any other data in addition to the storage block data, to the destination address. This may be done if the cost of the processing time for removing this data from a page is greater than the cost of the extra storage required to store the entire page, as opposed to only the storage block data in the page, in the magnetic disk storage device. This may also be done if the SSD and magnetic disk storage device use the same page layout in their respective file systems. Alternatively, if the magnetic disk storage device uses a different page layout than the SSD, then only a portion of each page including at least the storage block data is copied to the magnetic disk storage device.

In an embodiment, step 265 uses asynchronous or other high-speed write operations to copy storage block data from the sequential guaranteed write buffer in the SSD to the magnetic disk storage device. These high-speed write operations may not provide any storage or consistency guarantees in the event of a disruption of operation during data transfer. Regardless, write data is protected from loss due to the use of the sequential guaranteed write buffer in the SSD to store copies of the write data at least until the data transfer can be confirmed.

Decision block 270 determines if a new checkpoint has been reached. In an embodiment, a new checkpoint is established after a sufficient quantity of storage block data (e.g. 100 MB) has been copied to the magnetic disk storage device since the previous checkpoint. In other embodiments, a new checkpoint is established after a sufficient number of pages have been copied to the magnetic disk storage device since the previous checkpoint and/or a sufficient time period has elapsed.

If decision block 270 determines that a new checkpoint has been reached, step 275 updates the stored write transfer checkpoint index with the current value of the write transfer index and method 250 proceeds to step 280. This stored write transfer checkpoint index value will be preserved in the event of a power failure, so that subsequent iterations of method 250 will be able to access the stored write transfer checkpoint index in step 250. Conversely, if decision block 270 determines that a new checkpoint has not been reached, method 250 proceeds directly from decision block 270 to step 280.

In a further embodiment, step 275 first verifies that the most recent copy operation from step 265 and any other recently performed copy operations have been successfully completed and that the storage block data has been non-volatilely stored in the magnetic disk storage device, as opposed to any volatile write buffer included in the magnetic disk storage device. This may be done in one embodiment by issuing a write buffer flush command to the magnetic disk storage device.

In another embodiment, step 275 relies on probabilistic techniques to attempt to ensure that the most recent copy operation from step 265 and any other recently performed copy operations have been successfully completed and that the storage block data has been non-volatilely stored in the magnetic disk storage device. In this embodiment, step 275 updates the stored write transfer checkpoint index with a previous value of the write transfer index, rather than the current value of the write transfer index. The previous value of the write transfer index used for the write transfer index checkpoint value may be set based on the approximate transfer rate of storage block data to the magnetic disk storage device. If the previous value of the write transfer index is relatively far behind the current value of the write transfer index, the time elapsed between these copy operations is sufficient to provide nearly 100% probability that the magnetic disk storage device has copied the storage block data associated with the earlier copy operation to the disk. This embodiment is useful in implementations where write buffer flush or equivalent operations are not available, such as in some virtualized environments.

Step 280 sets the write transfer index to the next location in the sequential guaranteed write buffer. In an embodiment, step 280 sets the write transfer index to the page location following the most-recently stored page. If the sequential guaranteed write buffer is a circular buffer and the most-recently stored page is the last page location in the sequential guaranteed write buffer, then step 280 sets the write transfer index to the first page location.

Following step 280, method 250 proceeds back to decision block 285 to determine if the page corresponding with the newly updated write transfer index value has been copied to the magnetic disk storage device.

Figure 3:
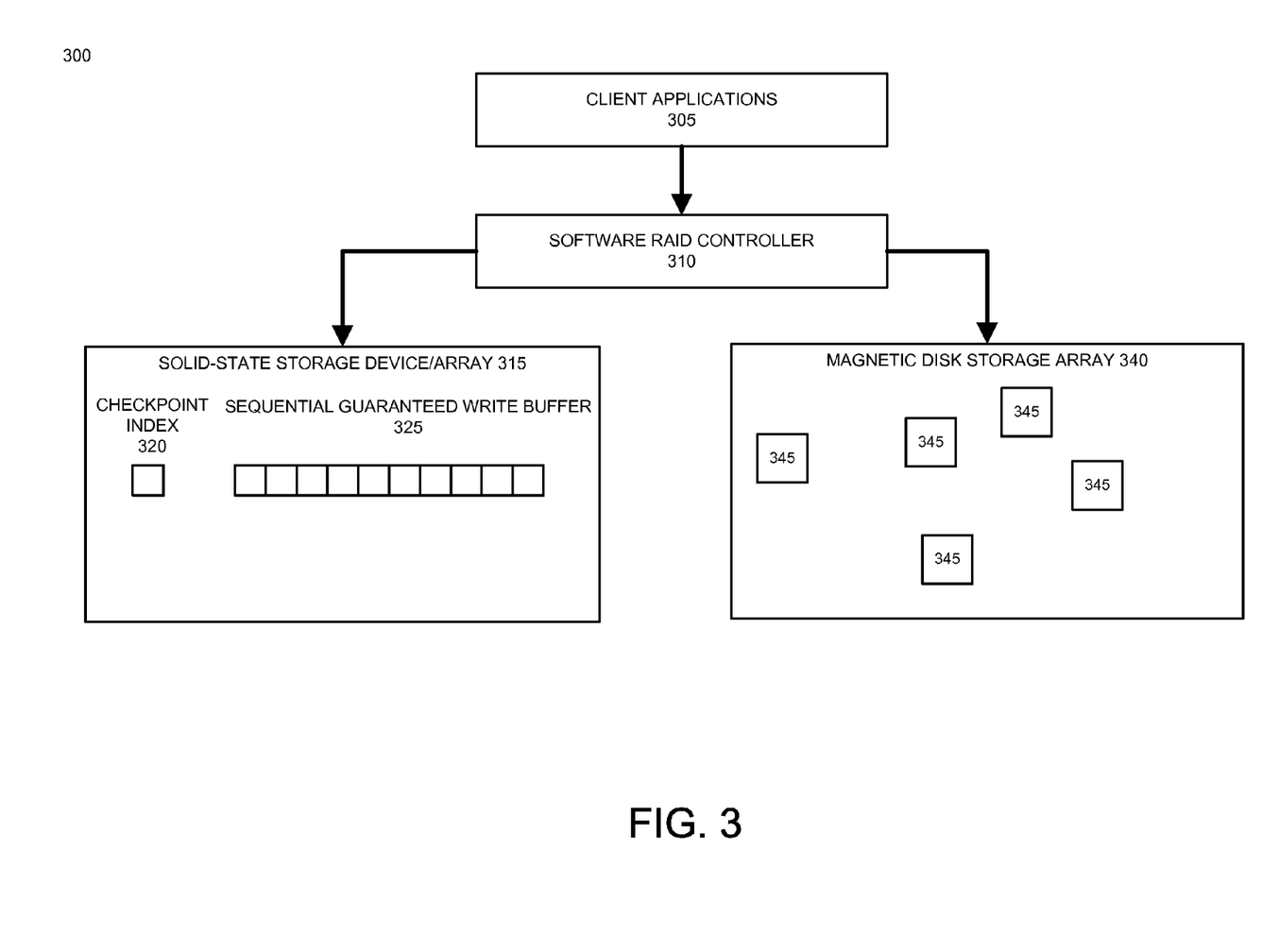
FIG. 3 illustrates an example RAID disk configuration suitable for use with embodiments of the invention.

Additionally, embodiments of the invention may be extended to ensure write consistency not only within a single magnetic data storage device, but also across multiple magnetic data storage devices operating together as a software-implemented RAID device. FIG. 3 illustrates an example RAID disk configuration 300 suitable for use with embodiments of the invention.

RAID disk configuration 300 includes one or more client applications 305 issuing write requests to software RAID controller 310. Typically, software RAID controller 310 generates multiple write requests to any arbitrary number of data storage devices 315 in response to each write request received from a client application 305. For example, in a simple RAID 1 configuration, software RAID controller 310 generates write requests for each of two or more data storage devices, with identical data to be written to each storage device. In other implementations, the software RAID controller 310 may include different write data in write requests to different storage devices, including portions of the write data from the client application's write request and/or error detection and/or correction data generated by the software RAID controller 310.

RAID disk configuration 300 includes one or more solid-state storage devices (SSDs) 315. In an embodiment, SSDs 315 are configured as a RAID array, such as in a RAID 1 mirroring configuration. Each of the one or more solid-state data storage devices 315 include data structures similar to those described above, including checkpoint index 320 and a sequential guaranteed write buffers 325.

Additionally, the RAID disk configuration 300 includes two or more magnetic disk storage device operating as a magnetic disk storage array 340, such as a RAID 1 mirroring configuration. Magnetic disk storage array 340 stores non-sequentially stored storage blocks 345. There may be different numbers of SSDs 315 and magnetic disk drives. In this embodiment, the one or more SSDs 315 and the magnetic disk storage array 340 are operated as described in methods 300 and 350 above, with the SSD(s) 315 and magnetic disk storage array 340 each being treated as a single storage device. The control module for one or more SSDs 315 and magnetic disk storage array 340 may be implemented as a software module separate from or integrated with the software RAID controller 310.

In the event of a power loss or other unscheduled system downtime, the combination of the sequential guaranteed write buffer and checkpoint index in the one or more SSDs 315 ensures that any data written to and acknowledged by a data storage device is preserved in that data storage device. However, the data stored on one of the SSDs 315 and/or any one of the magnetic disk storage devices in magnetic disk storage array 340 may be inconsistent with the data on one or more of the other SSD 315 or other magnetic disk storage devices. For example, this may occur if one of the SSDs 315 receives and acknowledges a write request from the software RAID controller 310, but another of the SSDs 315 does not get a chance to receive and/or acknowledge its corresponding write request before the power is lost. Similarly, if power is lost during the transfer of data from the one or more SSDs 315 to the magnetic disk storage array 340, some or all of the magnetic disk storage devices in the array 340 may not have a chance to store the write data. As a result, the magnetic disk storage devices in array 340 may be inconsistent with each other and/or the SSDs 315.

Figure 4:
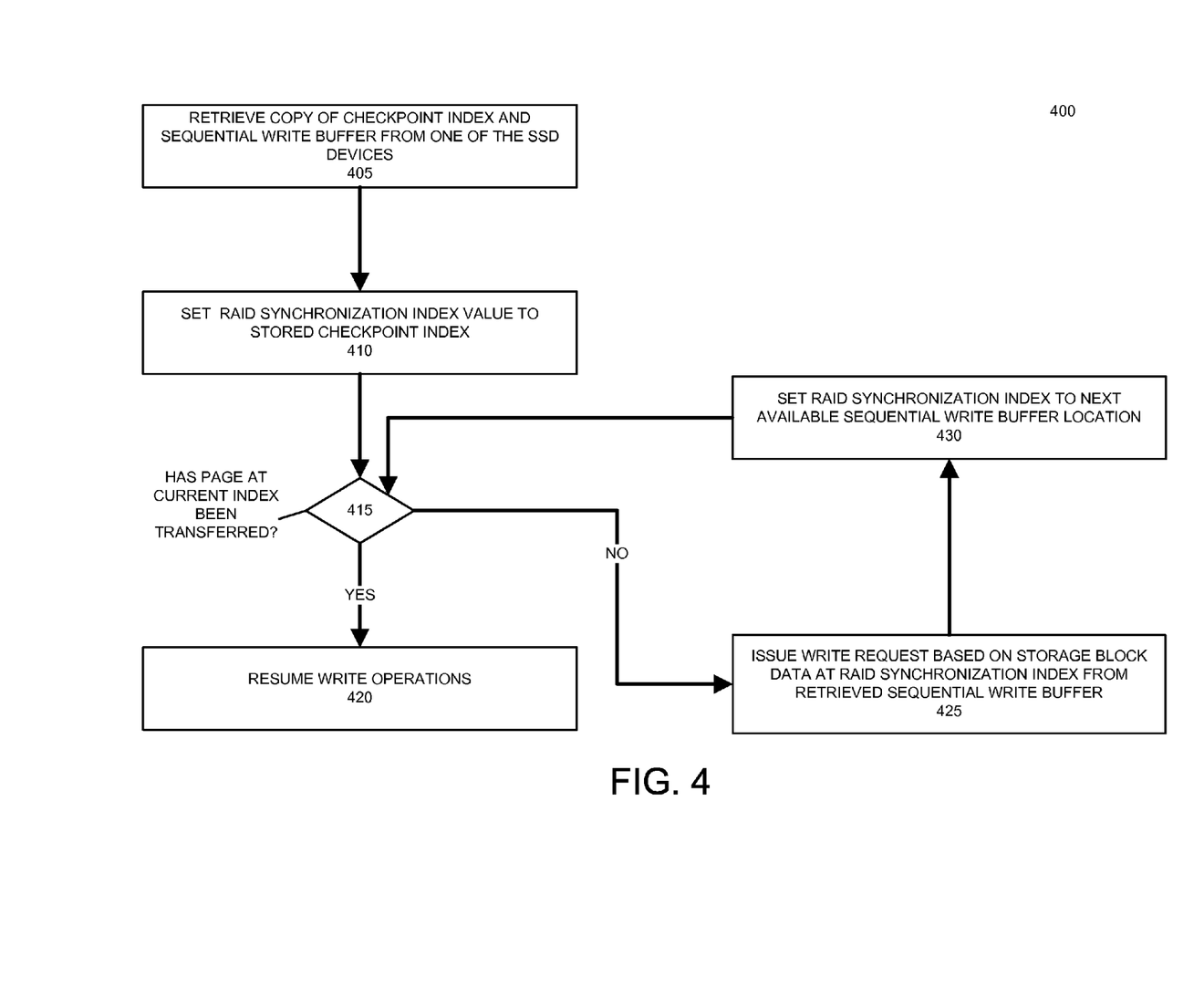
FIG. 4 illustrates a method of ensuring write operation consistency across multiple RAID devices with virtualized data storage according to an embodiment of the invention.

To counter this, FIG. 4 illustrates a method 400 of ensuring write operation consistency across multiple RAID devices with virtualized data storage according to an embodiment of the invention. Embodiments of method 400 are initiated during a system restart, such as after a power loss or other system downtime. Method 400 leverages the data structures and hardware utilized by methods 300 and 350 described above to extend write data consistency from one data storage device to multiple data storage devices operating in conjunction as part of a RAID configuration. Method 400 may be applied to RAID implementations similar to that in FIG. 3 as well as any other type of RAID configuration, including implementations including hardware RAID controllers without NVRAM or other hardware to ensure data consistency in the event of power loss.

Method 400 begins with step 405 retrieving a copy of the checkpoint index and the sequential write buffer from one of the solid-state storage devices. In an embodiment, step 405 requests these copies through the software RAID controller. In response, the software RAID controller retrieves the requested data from one of the solid-state data storage devices that are included in the SSD RAID configuration. In typical RAID 1 mirroring configurations, the software RAID controller does not allow client applications to specify which of the data storage devices data is retrieved from. Therefore, an embodiment of step 405 receives this requested data from an arbitrary one of the solid-state data storage devices. Because of the use of a sequential guaranteed write buffer included in the solid-state storage device, this checkpoint index and the sequential guaranteed write buffer are guaranteed to be internally consistent. However, this data may not be consistent with the data stored on other data storage devices, such as an additional SSD included in the same RAID configuration or any of the magnetic disk storage devices in the magnetic disk storage array 340.

Step 410 sets a RAID synchronization index value based on the value stored in the checkpoint index. In an embodiment, if the sequential guaranteed write buffer has not yet been used, then the checkpoint index may be initialized to the beginning location of the sequential guaranteed write buffer or any other arbitrary starting location. Otherwise, for example upon resuming operation following a power failure, the checkpoint index may include a value previously written by previous iterations of method 350.

In an embodiment, the checkpoint index indicates the location of a page in the sequential guaranteed write buffer that has been recently transferred to the magnetic disk storage array and had this transfer verified or guaranteed. In this embodiment, the RAID synchronization index is set to the next page location in the sequential guaranteed write buffer following the location indicated by the checkpoint index. In an alternate embodiment, the checkpoint index indicates the location of a page following the location in the sequential guaranteed write buffer that has been recently transferred to the magnetic disk storage array and had this transfer verified or guaranteed. In this embodiment, the RAID synchronization index is set to the checkpoint index value.

Following step 410, decision block 415 determines if the page in the sequential guaranteed write buffer that is referenced by the RAID synchronization index has been transferred to the magnetic disk storage array. In one embodiment, decision block 415 compares the sequence number of the page at the current RAID synchronization index with that of the page in the preceding location in the sequential guaranteed write buffer to determine if the current page needs to be transferred to the magnetic disk storage array.

If decision block 415 determines that the page in the sequential guaranteed write buffer specified by the RAID synchronization index needs to be transferred to the magnetic disk storage array, then method 400 proceeds to step 425. Step 425 accesses the destination address in current page in the copy of the sequential guaranteed write buffer, as specified by the RAID synchronization index, to retrieve the destination address stored in this page. This destination address was initially specified by the storage client with its write request.

Step 425 then issues a write request based on the current page in the sequential guaranteed write buffer to the software RAID controller. This directs the software RAID controller to write the storage block data in this page back to the RAID array in a consistent manner. In the case of a RAID 1 mirroring configuration, the storage block data from this page, which was retrieved from an arbitrary one of the solid-state data storage devices, is rewritten to all of the data storage devices in the RAID configuration including all of the magnetic disk storage devices in the magnetic disk storage array 340. In a further embodiment, this write operation is processed as described in methods 300 and 350 above, so that the storage block data is written to each of the data storage devices in the RAID configuration in a consistent and guaranteed manner. This includes storing the storage block data in a sequential guaranteed write buffer on at least one SSD and then transferring this storage block data from one of the sequential guaranteed write buffers to the magnetic disk storage array.

Following step 425, step 430 sets the RAID synchronization index to the next location in the sequential guaranteed write buffer. Following step 430, method 400 proceeds back to decision block 415 to determine if the page in the copy of the sequential guaranteed write buffer corresponding with the newly updated RAID synchronization index has been copied to the magnetic disk storage array.

On any iteration of method 400, if decision block 415 determines that the page in the copy of the sequential guaranteed write buffer corresponding with the newly updated RAID synchronization index has been copied to the magnetic disk storage array, then method 400 infers that all of the previously unsynchronized pages in the copy of the sequential guaranteed write buffer have been processed. As a result, all of the data storage devices in the RAID configuration are now consistent with each other. Thus, method 400 may proceed to step 420 and resume normal operation, such as receiving write requests from other client applications and/or storage client devices.

Figure 5:
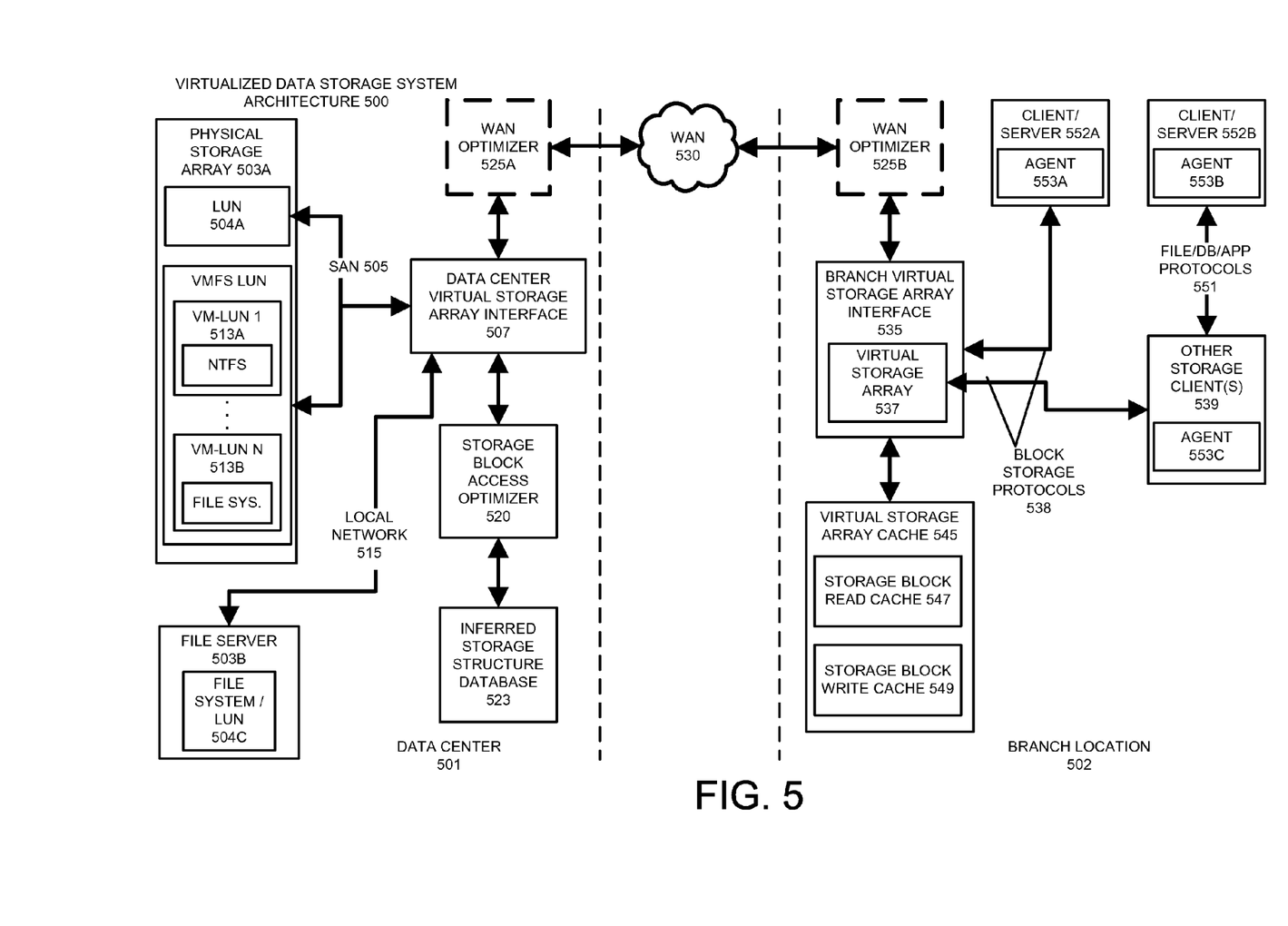
FIG. 5 illustrates a virtualized data storage system architecture according to an embodiment of the invention.

Embodiments of the invention as described above, with or without RAID configurations, may be applied in any application that requires high write performance, large storage capacity, and reliability and data consistency. For example, embodiments of the invention may be applied to store write data in virtualized data storage systems. FIG. 5 illustrates a virtualized data storage system architecture 500 according to an embodiment of the invention. Virtualized data storage system architecture 500 includes a data center 501 connected with at least one branch network location 502 via a wide-area network (WAN) 530. Each branch location 502 includes at least one storage client 539, such as a file server, application server, database server, or storage area network (SAN) interface. A storage client 539 may be connected with a local-area network (LAN) 551, including routers, switches, and other wired or wireless network devices, for connecting with server and client systems and other devices 552B.

Previously, typical branch location installations also required a local physical data storage device for the storage client. For example, a prior typical branch location LAN installation may include a file server for storing data for the client systems and application servers, such as database servers and e-mail servers. In prior systems, this branch location's data storage is located at the branch location site and connected directly with the branch location LAN or SAN. The branch location physical data storage device previously could not be located at the data center 501, because the intervening WAN 530 is too slow and has high latency, making storage accesses unacceptably slow for storage clients.

The example virtualized data storage system architecture 500 allows for storage consolidation of branch location-specific data storage at data centers connected with branch locations via wide area networks. This embodiment of the invention overcomes the bandwidth and latency limitations of the wide area network between branch locations and the data center. To this end, an embodiment of the invention includes virtual storage arrays.

In an embodiment, the branch location 502 includes a branch virtual storage array interface device 535. The branch virtual storage array interface device 535 presents a virtual storage array 537 to branch location users, such as the branch location storage client 539, such as a file or database server. A virtual storage array 537 can be used for the same purposes as a local storage area network or other data storage device. For example, a virtual storage array 537 may be used in conjunction with a storage client 539 such as a file server for general-purpose data storage, in conjunction with a database server for database application storage, or in conjunction with an e-mail server for e-mail storage. However, the virtual storage array 537 stores its data at a data center 501 connected with the branch location 502 via a wide area network 530. Multiple separate virtual storage arrays, from different branch locations, may store their data in the same data center and, as described below, on the same physical storage devices.

Because the data storage of multiple branch locations is consolidated at a data center, the efficiency, reliability, cost-effectiveness, and performance of data storage is improved. An organization can manage and control access to their data storage at a central data center, rather than at large numbers of separate branch locations. This increases the reliability and performance of an organization's data storage. This also reduces the personnel required at branch location offices to provision, maintain, and backup data storage. It also enables organizations to implement more effective backup systems, data snapshots, and disaster recovery for their data storage. Furthermore, organizations can plan for storage growth more efficiently, by consolidating their storage expansion for multiple branch locations and reducing the amount of excess unused storage. Additionally, an organization can apply optimizations such as compression or data deduplication over the data from multiple branch locations stored at the data center, reducing the total amount of storage required by the organization.

In an embodiment, branch virtual storage array interface 535 may be a stand-alone computer system or network appliance or built into other computer systems or network equipment as hardware and/or software. In a further embodiment, a branch location virtual storage array interface 535 may be implemented as a software application or other executable code running on a client system or application server.

In an embodiment, a branch location virtual storage array interface 535 includes one or more storage array network interfaces and supports one or more storage block network protocols to connect with one or more storage clients 539 via a local storage area network (SAN) 538. Examples of storage array network interfaces suitable for use with embodiments of the invention include Ethernet, Fibre Channel, IP, and Infini-Band interfaces. Examples of storage array network protocols include ATA, Fibre Channel Protocol, and SCSI. Various combinations of storage array network interfaces and protocols are suitable for use with embodiments of the invention, including iSCSI, HyperSCSI, Fibre Channel over Ethernet, and iFCP. In cases where the storage array network interface uses Ethernet, an embodiment of the branch location virtual storage array interface can use the branch location LAN's physical connections and networking equipment for communicating with client systems and application services. In other embodiments, separate connections and networking equipment, such as Fibre Channel networking equipment, is used to connect the branch location virtual storage array interface with client systems and/or application services.

It should be noted that the branch location virtual storage array interface 535 allows storage clients such as storage client 539 to access data in the virtual storage array via storage block protocols, unlike file servers that utilize file-based protocols, databases that use database-based protocols, or application protocols such as HTTP or other REST-based application interfaces. For example, storage client 539 may be integrated with a file server that also provides a network file interface to the data in the virtual storage array 537 to client systems and other application servers via network file protocol 551 such as NFS or CIFS. In this example, the storage client 539 receives storage requests to read, write, or otherwise access data in the virtual storage array via a network file protocol. Storage client 539 then translates these requests into one or more corresponding block storage protocol requests for branch virtual storage array interface 535 to access the virtual storage array 537.

In a further embodiment, the storage client is integrated as hardware and/or software in a client or server 552A, including client systems such as a personal computer, tablet computer, smartphone, or other electronic communications device, or server systems such as an application server, such as a file server, database server, or e-mail server. In another example, a client or server 552A communicates directly with the branch virtual storage array interface 535 via a block storage protocol 538, such as iSCSI. In this example, the client or server 552A acts as its own storage client.

In a further embodiment, the branch location virtual storage array interface 535 is integrated as hardware and/or software in a client or server 552A, including client systems such as a personal computer, tablet computer, smartphone, or other electronic communications device, or server systems such as an application server, such as a file server, database server, or e-mail server. In this embodiment, the branch location virtual storage array interface 535 can include application server interfaces, such as a network file interface, for interfacing with other application servers and/or client systems.

A branch location virtual storage array interface 535 presents a virtual storage array 537 to one or more storage clients 539 or 552A. To the storage clients 539 and 552A, the virtual storage array 537 appears to be a local storage array, having its physical data storage at the branch location 502. However, the branch location virtual storage array interface 535 actually stores and retrieves data from physical data storage devices located at the data center 501. Because virtual storage array data accesses must travel via the WAN 530 between the data center 501 LAN to a branch location 502 LAN, the virtual storage array 537 is subject to the latency and bandwidth restrictions of the WAN 530.

In an embodiment, the branch location virtual storage array interface 535 includes a virtual storage array cache 545, which is used to ameliorate the effects of the WAN 530 on virtual storage array 537 performance. In an embodiment, the virtual storage array cache 545 includes a storage block read cache 547 and a storage block write cache 549.

The storage block read cache 547 is adapted to store local copies of storage blocks requested by storage clients 539 and 552A. As described in detail below, the virtualized data storage system architecture 500 may attempt to predict which storage blocks will be requested by the storage clients 539 and 552A in the future and preemptively send these predicted storage blocks from the data center 501 to the branch 502 via WAN 530 for storage in the storage block read cache 547. If this prediction is partially or wholly correct, then when the storage clients 539 and 552A eventually request one or more of these prefetched storage blocks from the virtual storage array 537, an embodiment of the virtual storage array interface 535 can fulfill this request using local copies of the requested storage blocks from the block read cache 545. By fulfilling access requests using prefetched local copies of storage blocks from the block read cache 545, the latency and bandwidth restrictions of WAN 530 are hidden from the storage clients 539 and 552A. Thus, from the perspective of the storage clients 539 and 552A, the virtual storage array 537 appears to perform storage block read operations as if the physical data storage were located at the branch location 502.

In an embodiment, the branch location virtual storage array interface 535 operates in conjunction with a data center virtual storage array interface 507. The data center virtual storage array interface 507 is located on the data center 501 LAN and may communicate with one or more branch location virtual storage array interfaces via the data center 501 LAN, the WAN 530, and their respective branch location LANs. Data communications between virtual storage array interfaces can be in any form and/or protocol used for carrying data over wired and wireless data communications networks, including TCP/IP.

In an embodiment, data center virtual storage array interface 507 is connected with one or more physical data storage devices 503 to store and retrieve data for one or more virtual storage arrays, such as virtual storage array 537. To this end, an embodiment of a data center virtual storage array interface 507 accesses a physical storage array network interface, which in turn accesses physical data storage array 503a on a storage array network (SAN) 505. In another embodiment, the data center virtual storage array interface 507 includes one or more storage array network interfaces and supports one or more storage array network protocols for directly connecting with a physical storage array network 505 and its physical data storage array 503a. Examples of storage array network interfaces suitable for use with embodiments of the invention include Ethernet, Fibre Channel, IP, and InfiniBand interfaces. Examples of storage array network protocols include ATA, Fibre Channel Protocol, and SCSI. Various combinations of storage array network interfaces and protocols are suitable for use with embodiments of the invention, including iSCSI, HyperSCSI, Fibre Channel over Ethernet, and iFCP. Embodiments of the data center virtual storage array interface 507 may connect with the physical storage array interface and/or directly with the physical storage array network 505 using the Ethernet network of the data center LAN and/or separate data communications connections, such as a Fibre Channel network.

In another embodiment, data center virtual storage array interface 507 may store and retrieve data for one or more virtual storage arrays, such as virtual storage array 537, using a network storage device, such as file server 503b. File server 503b may be connected with data center virtual storage array 537 via local-area network (LAN) 515, such as an Ethernet network, and communicate using a network file system protocol, such as NFS, SMB, or CIFS.

Embodiments of the data center virtual storage array interface 507 may utilize a number of different arrangements to store and retrieve virtual storage array data with physical data storage array 503a or file server 503b. In one embodiment, the virtual data storage array 537 presents a virtualized logical storage unit, such as an iSCSI or FibreChannel logical unit number (LUN), to storage clients 539 and 552A. This virtual logical storage unit is mapped to a corresponding logical storage unit 504a on physical data storage array 503a. In a further embodiment, the data center virtual data storage array interface 507 supports multiple branch locations and maps each storage client's virtualized logical storage unit to a different non-virtual logical storage unit provided by physical data storage array 503a.

In another embodiment, virtual data storage array interface 507 maps a virtualized logical storage unit to a virtual machine file system 504b, which is provided by the physical data storage array 503a. Virtual machine file system 504b is adapted to store one or more virtual machine disk images 513, each representing the configuration and optionally state and data of a virtual machine. Each of the virtual machine disk images 513, such as virtual machine disk images 513a and 513b, includes one or more virtual machine file systems to store applications and data of a virtual machine. To a virtual machine application, its virtual machine disk image 513 within the virtual machine file system 504b appears as a logical storage unit. However, the complete virtual machine file system 504b appears to the data center virtual storage array interface 507 as a single logical storage unit.

In another embodiment, virtual data storage array interface 507 maps a virtualized logical storage unit to a logical storage unit or file system 504c provided by the file server 503c.

As described above, storage clients can interact with virtual storage arrays in the same manner that they would interact with physical storage arrays. This includes issuing storage commands to the branch location virtual storage interface using storage array network protocols such as iSCSI or Fibre Channel protocol. Most storage array network protocols organize data according to storage blocks, each of which has a unique storage address or location. A storage block's unique storage address may include logical unit number (using the SCSI protocol) or other representation of a logical volume.

In an embodiment, the virtual storage array provided by a branch location virtual storage interface allows a storage client to access storage blocks by their unique storage address within the virtual storage array. However, because one or more virtual storage arrays actually store their data within one or more of the physical data storage devices 503, an embodiment of the invention allows arbitrary mappings between the unique storage addresses of storage blocks in the virtual storage array and the corresponding unique storage addresses in one or more physical data storage devices 503. In an embodiment, the mapping between virtual and physical storage address may be performed by a branch location virtual storage array interface 537 and/or by data center virtual storage array interface 507. Furthermore, there may be multiple levels of mapping between the addresses of storage blocks in the virtual storage array and their corresponding addresses in the physical storage device.

In an embodiment, storage blocks in the virtual storage array may be of a different size and/or structure than the corresponding storage blocks in a physical storage array or data storage device. For example, if data compression is applied to the storage data, then the physical storage array data blocks may be smaller than the storage blocks of the virtual storage array to take advantage of data storage savings. In an embodiment, the branch location and/or data center virtual storage array interfaces map one or more virtual storage array storage blocks to one or more physical storage array storage blocks. Thus, a virtual storage array storage block can correspond with a fraction of a physical storage array storage block, a single physical storage array storage block, or multiple physical storage array storage blocks, as required by the configuration of the virtual and physical storage arrays.

In a further embodiment, the branch location 502 and data center location 501 may optionally include network optimizers 525, such as WAN optimization modules 525A and 525B, for improving the performance of data communications over the WAN between branches and/or the data center. Network optimizers 525 can improve actual and perceived WAN network performance using techniques including compressing data communications; anticipating and prefetching data; caching frequently accessed data; shaping and restricting network traffic; and optimizing usage of network protocols. In an embodiment, network optimizers 525 may be used in conjunction with virtual data storage array interfaces 507 and 535 to further improve virtual storage array 537 performance for storage blocks accessed via the WAN 530. In other embodiments, network optimizers 525 may ignore or pass-through virtual storage array 537 data traffic, relying on the virtual storage array interfaces 507 and 535 at the data center 501 and branch location 502 to optimize WAN performance.

To assist in the prediction and prefetching of storage blocks for caching in the storage block read cache 547, embodiments of the invention include prefetching agent applications, modules, or processes, such as agents 553A, 553B, and 553C, that monitor activity of clients and servers 552 utilizing the virtual storage array 537. Embodiments of the prefetching agent applications 553 may be implemented as an independent application; a background process; as part of an operating system; and/or as a device or filter driver. In further embodiments, if a client, server, or other storage client is implemented within a virtual machine or other type of virtualization system, the prefetching agent application may be implemented as above and/or as part of the virtual machine application or supporting virtualization platform.

Embodiments of the virtualized data storage system architecture 500 attempt to predict which storage blocks will be requested by a storage client in the near future, prefetches these storage blocks from the physical data storage devices 503, and forwards these to the branch location 502 for storage in the storage block read cache 547. When this prediction is successful and storage block requests may be fulfilled in whole or in part from the block read cache 547, the latency and bandwidth restrictions of the WAN 530 are hidden from the storage client.

An embodiment of the virtualized data storage system architecture 500 includes a storage block access optimizer 520 and optionally an inferred storage structure database (ISSD) 523 to select storage blocks for prefetching to storage clients. In an embodiment, the storage block access optimizer 520 and ISSD 523 are located at the data center 501 and is connected or incorporated into the data center virtual data storage array interface 507. In an alternate embodiment, the storage block access optimizer 520 may be located at the branch location 502 and be connected with or incorporated into the branch location virtual data storage interface 535.

Similarly, the storage block write cache 549 is adapted to store local copies of new or updated storage blocks written by the storage clients 539 and 552A. The storage block write cache 549 temporarily stores new or updated storage blocks written by the storage clients 539 and 552A until these storage blocks are copied back to physical data storage at the data center 501 via WAN 530. By temporarily storing new and updated storage blocks locally at the branch location 502, the bandwidth and latency of the WAN 530 is hidden from the storage clients 539 and 552A. Thus, from the perspective of the storage clients 539 and 552A, the virtual storage array 537 appears to perform storage block write operations as if the physical data storage were located at the branch location 502.

In an embodiment, the virtual storage array cache 545 includes non-volatile and/or redundant data storage, so that data in new or updated storage blocks are protected from system failures until they can be transferred over the WAN 530 and stored in physical data storage at the data center 501. In a further embodiment, the virtual storage array write cache 549 is implemented using a sequential guaranteed write buffer included in at least one SSD as well as at least one magnetic disk storage device for storing new and updated storage blocks until they are transferred over the WAN 530 and stored in physical data storage at the data center 501. The SSD and magnetic disk storage device are operated according to the embodiments described in methods 200 and 250 above. If storage block write cache 549 includes multiple SSDs and magnetic disk storage devices, these may further be operated in a RAID configuration operated according to the embodiments described in method 400.

Figure 6:
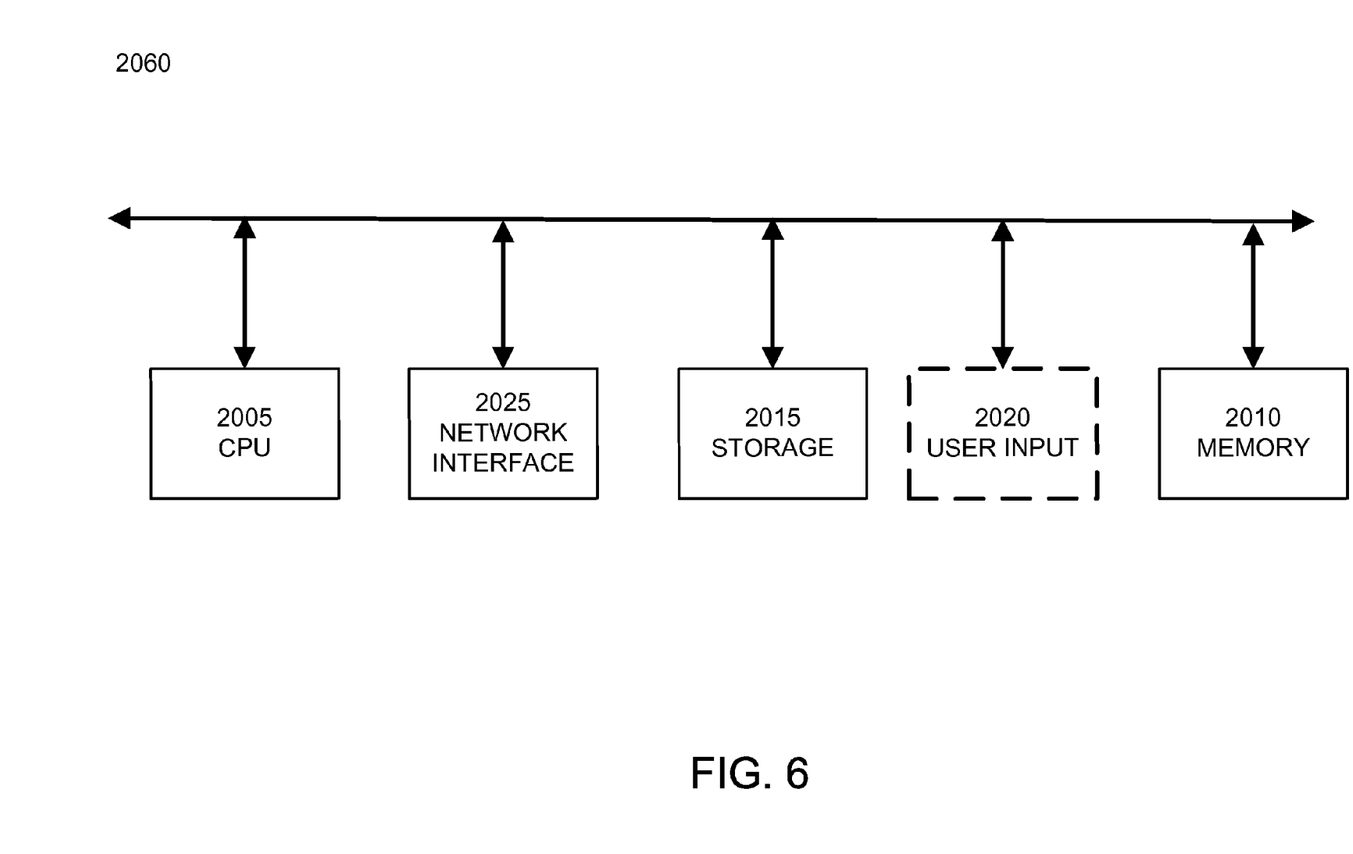
FIG. 6 illustrates an example computer system capable of a virtualized data storage system device according to an embodiment of the invention.

Computer system 2000 includes a central processing unit (CPU) 2005 for running software applications and optionally an operating system. CPU 2005 may be comprised of one or more processing cores. In a further embodiment, CPU 2005 may execute virtual machine software applications to create one or more virtual processors capable of executing additional software applications and optional additional operating systems. Virtual machine applications can include interpreters, recompilers, and just-in-time compilers to assist in executing software applications within virtual machines. Additionally, one or more CPUs 2005 or associated processing cores can include virtualization specific hardware, such as additional register sets, memory address manipulation hardware, additional virtualization-specific processor instructions, and virtual machine state maintenance and migration hardware.

Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, or other magnetic, optical, or solid state storage devices. In an embodiment, storage 2015 includes multiple storage devices configured to act as a storage array for improved performance and/or reliability. In a further embodiment, storage 2015 includes a storage array network utilizing a storage array network interface and storage array network protocols to store and retrieve data. Examples of storage array network interfaces suitable for use with embodiments of the invention include Ethernet, Fibre Channel, IP, and InfiniBand interfaces. Examples of storage array network protocols include ATA, Fibre Channel Protocol, and SCSI. Various combinations of storage array network interfaces and protocols are suitable for use with embodiments of the invention, including iSCSI, HyperSCSI, Fibre Channel over Ethernet, and iFCP.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include a wired networking interface, such as one or more Ethernet connections to communicate with other networking devices via local or wide-area networks.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

Further embodiments can be envisioned to one of ordinary skill in the art after reading the attached documents. For example, embodiments of the invention can be used with any number of network connections and may be added to any type of network device, client or server computer, or other computing device in addition to the computer illustrated above. In other variations, combinations or sub-combinations of the above disclosed embodiments can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of storing data to a data storage device, the method comprising:
receiving a write operation including write data and a destination address;
storing a page in a sequential write buffer included in a first non-volatile storage device guaranteeing data consistency and durability, wherein the page includes the destination address and the write data; and upon completing the storage of the page in the sequential write buffer, transferring at least the write data from the page to a second non-volatile storage device that does not guarantee data consistency and/or durability.

2. The method of claim 1, wherein the first non-volatile storage device includes a solid-state storage device that guarantees data consistency.

3. The method of claim 1, wherein the second non-volatile storage device includes a magnetic disk storage device.

4. The method of claim 1, wherein the second non-volatile storage device has a data capacity larger than the first non-volatile storage device.

5. The method of claim 1, wherein at least the write data is stored in the destination address in the second non-volatile storage device.

6. The method of claim 5, wherein the page is stored in the sequential write buffer in a storage location indicative of the order of the write operation relative to previously received write operations.

7. The method of claim 1, comprising:
determining if a checkpoint has been reached; and
in response to the determination that the checkpoint has been reached, updating a checkpoint index value.

8. The method of claim 7, wherein the checkpoint index value is stored in the first non-volatile storage device.

9. The method of claim 7, wherein determining if the checkpoint has been reached comprises determining if a predefined quantity of data has been transferred to the second non-volatile storage device since a previous checkpoint.

10. The method of claim 7, wherein determining if the checkpoint has been reached comprises determining if a predefined quantity of pages has been transferred to the second non-volatile storage device since a previous checkpoint.

11. The method of claim 7, wherein determining if the checkpoint has been reached comprises determining if a predefined quantity of time has passed since a previous checkpoint.

12. A method of storing data to a data storage device, the method comprising:
accessing a previously stored checkpoint index value;
setting a write transfer index to the previously stored checkpoint index value;
selecting a page at a location in a sequential write buffer associated with the write transfer index, wherein the sequential write buffer is included in a first non-volatile storage device guaranteeing data consistency;
determining if the selected page has previously been transferred to a second non-volatile storage device that does not guarantee data consistency; and
in response to the determination that the selected page may not have been transferred to the second non-volatile storage device, transferring at least the write data from the selected page to the second non-volatile storage device.

13. The method of claim 12, comprising:
following the transfer of at least the write data from the selected page, setting the write transfer index to a second location in the sequential write buffer; and
repeating the steps of selecting, determining, and transferring with the write transfer index set to the second location.

14. The method of claim 12, wherein the location of the selected page in the sequential write buffer is indicative of a relative order of receipt of a corresponding write operation with respect to other write operations.

15. The method of claim 12, wherein the selected page includes a destination address and transferring at least the write data from the selected page comprises storing the write data at the destination address in the second non-volatile storage device.

16. The method of claim 12, wherein determining if the selected page has previously been transferred to the second non-volatile storage device comprises:
comparing an attribute of the selected page with an attribute of a previous page in the sequential write buffer.

17. The method of claim 12, wherein in response to the determination that the selected page has been previously transferred to the second non-volatile storage device, waiting for the receipt of a write operation.

18. The method of claim 12, wherein the first non-volatile storage device includes a solid-state storage device that guarantees data consistency.

19. The method of claim 12, wherein the second non-volatile storage device includes a magnetic disk storage device.

20. The method of claim 12, wherein the second non-volatile storage device has a data capacity larger than the first non-volatile storage device.

21. The method of claim 13, comprising:
determining if a checkpoint has been reached; and
in response to the determination that the checkpoint has been reached, updating the previously stored checkpoint index value with a value based on the location of the selected page in the sequential write buffer.

22. The method of claim 21, wherein the checkpoint index value is stored in the first non-volatile storage device.

* * * * *